United States Patent Office 3,286,177
Patented Nov. 15, 1966

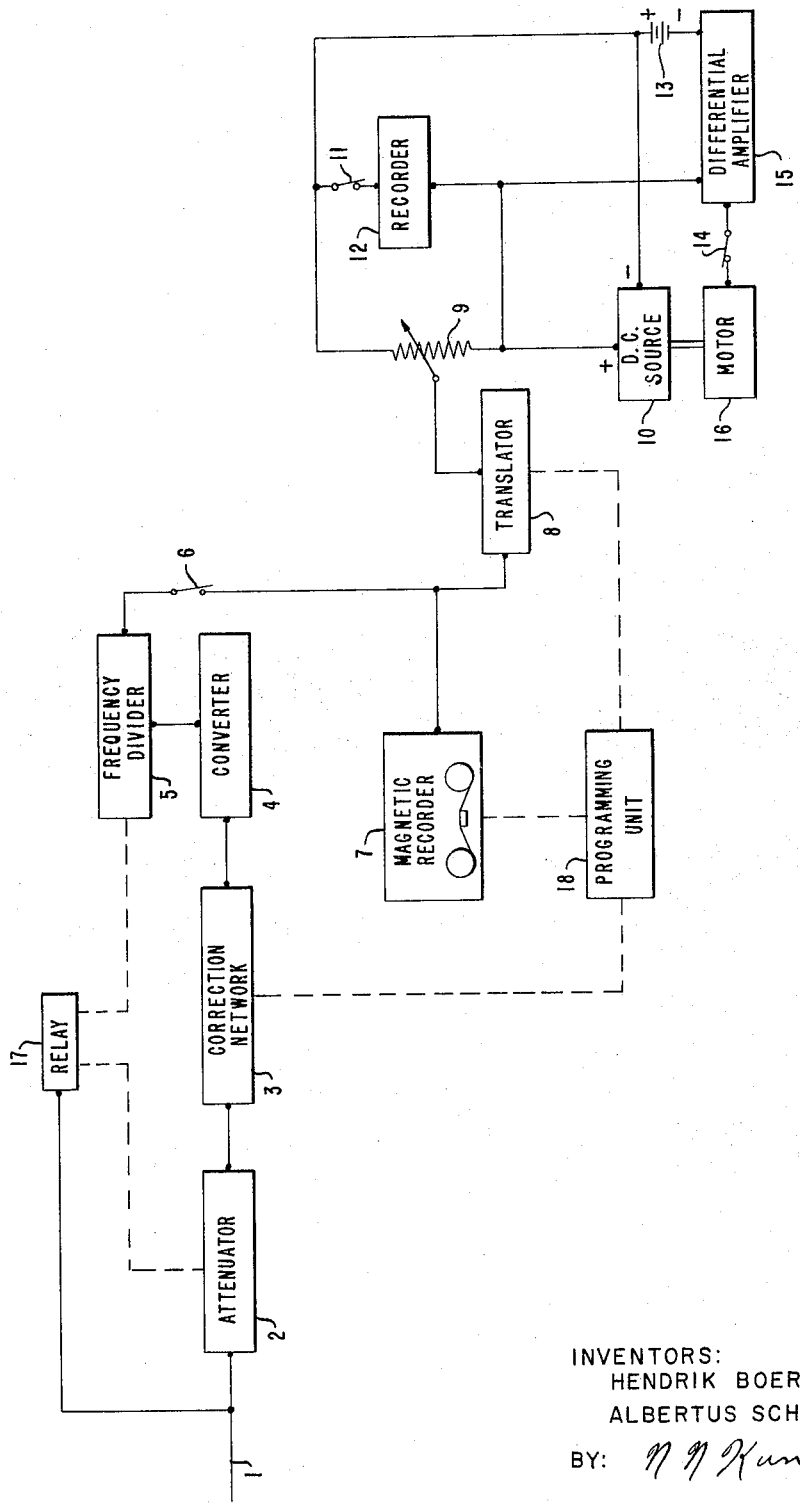

3,286,177
APPARATUS FOR ANALYZING PEAKS BY DETERMINING THE CONTRIBUTION OF INDIVIDUAL PEAKS TO THE WHOLE SIGNAL UTILIZING VOLTAGE TO FREQUENCY TO VOLTAGE CONVERSION
Hendrik Boer and Albertus Schuringa, Amsterdam, Netherlands, assignors to Shell Oil Company, New York, N.Y., a corporation of Delaware
Filed Oct. 31, 1962, Ser. No. 234,446
Claims priority, application Netherlands, Apr. 27, 1962, 277,716
5 Claims. (Cl. 324—103)

The invention relates to a method and an apparatus for analyzing a signal which shows a number of peaks, in particular a signal derived from a detector used for chromatographic and especially gas-chromatographic separation; the signal to be analyzed is converted into electrical impulses the number of which per second (frequency) is proportional to the momentary magnitude of the signal.

When shown in the form of a graph a signal with peaks is a curve which returns completely or partially to the base line two or more times. The present analysis may, however, also relate to a signal which, shown in the form of a graph, is a curve returning to the base line once only or not at all. In this case the peaks, in this instance artificial peaks, develop when the course of the curve is divided into parts by ordinates plotted at various points of the axis of the abscissa. The analysis then relates to the various areas (artificial peaks) below the curve, which each time are defined by the curve, two ordinates and the base line.

The analysis of a signal with peaks consists in determining the contributions of the relevant peaks as part of the whole signal which operation is called normalization. An analysis of this type is known and is frequently used in chromatography. In the chromatographic separation of mixtures the analysis results are usually obtained in the form of a diagram. This diagram shows a number of peaks which correspond to the components contained in the mixture. The area of a peak in this diagram is a measure of the quantity of the relevant component in the mixture, at least when the chromatographic detector shows all components with the same degree of sensitivity. This, however, is not usually the case, so that after the various peak areas have been determined each one should still be corrected or weighted for the specific behavior of the detector for the particular component in question. The sum of the various peak areas, possibly weighted, is then determined and finally each peak area, is divided by this sum (normalization) in order to obtain the percentages of the various components in the starting mixture.

It should also be noted that it is not always necessary for all the peaks of the diagram to be included in the normalization. Some peaks such as the air peak do not belong to components of the starting mixture; sometimes peaks occur which are not of interest for analysis purposes and it may sometimes happen that certain peaks are so small that they have little or no influence on the whole, while it is also not essential to know their individual contribution. Whenever reference is made hereinafter to each peak which occurs in the signal only those peaks are meant which are important to the analysis and are therefore covered by the analysis.

The method outlined above is time-consuming and is less suitable, or completely unsuitable, for practical purposes when a plant or refinery has to be controlled or regulated, especially by automatic control, with reference to the results of the chromatographic separation. In this case the result of the chromatographic analysis has to be available in the shortest possible time and, preferably fully automatically.

In order to achieve this the entire series of impulses, corresponding to the whole signal to be analyzed, is passed to a memory which is preferably a magnetic memory and recorded therein; simultaneously or subsequently by reading out the memory, these impulses are supplied to a translator which in consequence builds up a resistance proportional in value to the number of impulses received; by means of a controllable direct-current source connected to this resistance the current through the resistance is controlled in such a way that the voltage over the resistance when it has reached its final value corresponding to the entire series of impulses, assumes a certain, possibly adjustable value, thereupon the voltage of the direct-current source is maintained at the value thus reached; the impulses recorded in the memory are then supplied by groups, each group corresponding to a peak of the signal, to the translator by reading-out the memory, the translator-resistance being each time reduced to its zero value before a group is read-in; finally the voltages which occur over the translator-resistance are measured and, if desired, recorded, at least whenever this resistance has reached the final value corresponding to a certain peak.

If the method is used for analyzing a series of similar signals the setting of the voltage of the direct-current source may sometimes be omitted and this voltage maintained at the value once established or this setting may be merely repeated from time to time.

The method according to the invention, and in particular the apparatus preferably used for this method, will now be further illustrated with reference to the drawing. The figure shows a diagram of an apparatus suitable for analyzing a signal with peaks derived from a gas chromatographic detector. The signal from the detector, after any necessary amplification, is supplied as an electrical signal at 1 to an attenuator circuit 2; the signal next passes through a correction circuit 3, which will be further discussed below, and is then passed to a convertor 4 where the signal is converted into electrical impulses the frequency of which is proportional to the momentary magnitude of the signal supplied. The impulses are passed via a frequency divider 5 and a switch 6 to a magnetic memory 7, e.g., a tape-recorder, and a translator 8.

In another embodiment of the invention the impulses are only passed to the tape recorder 7 and recorded. The memory is then read-out twice in succession, first for setting the direct-current source and secondly for the reading-in by groups of the peaks into the translator. This method, however, takes a somewhat longer time.

The translator 8 determines and commands the magnitude of a resistance 9 which is incorporated in a circuit also containing a direct-current source 10 with controllable voltage. The resistance 9 may, for instance, be formed of a series of separate resistances which are switched on and off by means of relays. The voltage over the resistance 9 may be measured and recorded via a switch 11 by a recording device 12. This voltage is also connected in series with the voltage of a direct-current source 13 of constant voltage, the said source 13 being so poled that the two voltages are connected in opposition.

The sum of the two voltages connected in opposition is passed to an amplifier 15, the output voltage of which drives, via a switch 14, a servomotor 16 which motor commands the voltage of the direct-current source 10. The motor so controls the voltage of source 10 that the voltage over the resistance 9 is equivalent and opposite to the voltage of source 13. In this case both the input and output voltages of the amplifier 15 are zero and the servomotor remains at rest.

A relay 17 is affected by the voltage from the detector; if this voltage exceeds a certain value both the attenuator circuit 2 and the frequency divider 5 are simultaneously switched; when the voltage falls below a certain value, preferably the same value as stated above, the switching of attenuater 2 and frequency divider 5 is again simultaneously annulled by the relay 17. The purpose of switching, which is only necessary if the operating range of the converter 4 is too small as a result of non-linearity or of too small a signal-to-noise ratio, is to facilitate exact measurement, especially when both very small and very large peaks appear in the signal.

Whether the peaks are small or large the converter 4 should, in fact, convert the signal into impulses as accurately as possible so that a linear relationship is reached throughout between signal magnitude and number of impulses per second. For this reason the signal supplied to the converter 4 (during the time peaks are to be measured) should not be too small, since otherwise the noise present makes the translation into pulses inaccurate, nor too large, as in this case the linear operating range of the converter would be exceeded.

To meet these requirements a circuit 2 is used which, when a certain, possibly adjustable value is exceeded, attenuates the signal in a given degree. The moment at which the attenuation is switched on is determined by the relay 17. If it is known in advance at what moments the signal will be too great or will fall below a certain value, the function of the relay 17 can be performed by a programming unit 18.

The circuit 5 is a frequency divider which reduces the number of impulses from converter 4 in the same proportion as the magnitude of the signal is reduced by the attenuater circuit 2. This frequency division is, however, only used as long as the signal passes through the attenuater circuit 2 without attenuation; if the signal is attenuated by the attenuater 2 the frequency division is simultaneously switched off via the relay 17. The number of impulses per second passed to the switch 6 is therefore always independent of the position of the relay 17; either attenuater 2 does not attenuate and there is an $n$-fold frequency division or attenuater 2 has an $n$-fold attenuation and there is no frequency division at 5.

Although the given embodiment is preferably used it will be clear that in another embodiment frequency divider 5 may be designed as an $n$-fold frequency multiplier which operates with relatively large signals, the circuit 2 switching on an $n$-fold attenuation, but not with relatively small ones. This part of the apparatus which need not always be used is described in detail in the copending patent application of Albertus Schuringa, Serial No. 234,491, filed October 31, 1962.

The correction circuit 3 can attenuate the signal in a controllable manner. In the case of chromatography the detector is generally not equally sensitive to all components of the mixture of substances to be analyzed. Each peak of the signal should therefore be multiplied by a relevant factor so that each peak is weighted correctly in relation to the sensitivity of the detector. The attenuation by the circuit 3 should increase with increasing sensitivity of the detector to a certain component i.e. signal magnitude per unit of quantity of the component in question. A programming unit 18 ensures that the circuit 3 is correctly set before the appearance of a peak in the signal. Although in practice an attenuation circuit is used as being the simplest apparatus for achieving the desired purpose of weighting the various peaks of the signal, it will be manifest that an amplifier circuit of variable amplification could in principle also be used. The positions of the circuits 2 and 3 may also be reversed; this would be especially desirable if correction circuit 3 were designed in the form of an amplifier.

The apparatus shown in the diagram operates as follows.

The tape recorder 7 is switched on by the programming unit 18 in good time before the appearance of the first peak; this type recorder memorizes magnetically the impulses received via the closed switch 6. These impulses also pass to the translator 8 which builds up a resistance 9 the magnitude of which is equivalent to the sum of all the impulses belonging to the signal to be analyzed. At the beginning of the signal the resistance 9 is naturally at zero. The various peaks are successively recorded as group impulses by 7, while the translator 8 constantly builds up a higher resistance 9 whose ultimate value is a measure of the sum of the impulses belonging to the various peaks.

The voltage of the direct-current source 10 and hence the current through the resistance 9 are controlled, as stated hereinbefore, via amplifier 15 and servomotor 16 in such a way that the voltage over the resistance 9 attains the constant value of the direct-current source 13. This control is preferably brought into operation immediately when the whole series of impulses of the signal is read-in. Since the source 10 has a maximum voltage the control is not, of course, effective at the beginning. The actual control begins as soon as the voltage over 9 exceeds the voltage of 13, the value of which is preferably equal to the voltage for maximum deflection of the recorder 12 (e.g., 2.5 mv.).

It is also possible to ensure that the control of the voltage source 10 does not begin until immediately after the reading-in of the complete signal. The first method of control is advisable as being somewhat simpler in practice.

When the signal has been completely read-in the switch 6 is opened and the servomotor 16 switched off by opening the switch 14. In this way the voltage of source 10 is kept at the value ultimately attained. The resistance 9 is then again set at zero.

The tape recorder 7 is then played back so that the groups of impulses, each representing one peak are successively passed to the translator 8. For each group the translator 8 builds up a separate resistance value of 9, corresponding to the number of impulses in each group. At the beginning of each peak the resistance 9 is reset at the zero position. When a group of impulses has passed and a certain value of resistance 9 has been built up corresponding to the peak concerned, the value of the voltage over the resistance 9 is measured and, if desired, recorded on the recorder 12. The deflection of the recorder 12 provides an immediate measure of the percentage of the component in the mixture which is represented by the said peak. Usually the recorder 12 continuously measures and records the voltage across resistance 9. It is, however, also possible only to measure and record the voltage immediately after the passage of a group of impulses.

The different settings of the various parts of the apparatus are effected by the programming unit 18, assisted, if desired, by a signal-slope detector (not shown) which observes the appearance, and possibly the disappearance of a peak. If it is known at what times the peaks in a signal will appear and disappear, which is generally the case when the apparatus is used on a technical scale, the use of a signal-slope detector is unnecessary. The programming unit may be so preset that all the requisite operations are automatically carried out in the right order. When a tape recorder is used additional tracks may be employed for programming and pulse-group indication.

Obviously, various modifications of the present invention are possible in view of the above teachings. It is therefore to be understood that the invention is not limited to the particular form illustrated but is capable of embodiment in other forms without departing from the spirit and scope of the appended claims.

We claim as our invention:

1. Apparatus for analyzing a signal containing a plurality of peaks each of which represents the quantity of one of a plurality of substances determined by a chromatographic separation comprising:
- (a) means for converting said signal to a plurality of electrical impulses the frequency of which is proportional to the momentary magnitude of said signal, said electrical impulses occurring in groups with each group corresponding to one of the peaks in the signal;
- (b) storage means connected to the output of said converting means for storing said plurality of electrical impulses;
- (c) a variable resistor;
- (d) translating means connected to the output of said storage means for varying the resistor to a value of resistance corresponding to the number of impulses received;
- (e) circuit means connected in series with said resistor and producing a voltage proportional to the total number of electrical impulses;
- (f) programming means for sequentially reading out the said groups of electrical impulses from said storage means and for returning said resistor to zero before each said group of electrical impulses is read out; and
- (g) means for measuring the voltage across said resistance.

2. The apparatus of claim 1 including means for correcting each of said peaks for the difference in sensitivity of the detector used in the chromatographic separation to the particular substance represented by the particular peak, the output of said correcting means being connected to the input of said converting means.

3. Apparatus for analyzing a signal containing a plurality of peaks each of which represents the quantity of one of a plurality of substances determined by a chromatographic separation comprising:
- (a) means for converting said signal to a plurality of electrical impulses the frequency of which is proportional to the momentary magnitude of said signal, said electrical impulses occurring in groups with each group corresponding to one of the peaks in the signal;
- (b) a variable resistor;
- (c) translating means connected to the output of said converting means for varying the resistor to a value of resistance corresponding to the total number of electrical impulses received;
- (d) a variable D.C. source connected in series with said resistor;
- (e) measuring means connected across said resistor;
- (f) means for varying said D.C. voltage source to a value which will cause full scale deflection of said measuring means when said resistance has attained a value proportional to the total number of electrical impulses contained in said signal;
- (g) a storage means connected to the output of said converting means for storing said groups of electrical impulses;
- (h) programming means for sequentially reading out the said groups of electrical impulses from said storage means and returning said resistor to zero before each said group of electrical impulses is read out; and
- (i) means for disconnecting the means for varying said D.C. voltage from said resistor prior to actuating said programming means.

4. The apparatus of claim 3 wherein said means for varying said D.C. voltage source comprises:
- (a) a source of D.C. reference voltage of a value equal to full scale deflection of said meter and having a first and second terminal, said first terminal being connected to the oppositely poled terminal of said first mentioned source of D.C. voltage;
- (b) a difference amplifier having one of its inputs connected to said second terminal of said source of D.C. reference voltage and a second input connected to the remaining terminal of said source of D.C. voltage; and
- (c) a servomotor responsive to the output of said difference amplifier and having its rotor connected to said first-mentioned source of D.C. voltage.

5. The apparatus of claim 4 including means for correcting each of said peaks for the difference in sensitivity of the detector used in the chromatographic separation to the particular substance represented by the particular peak, the output of said correcting means being connected to the input of said converting means.

No references cited.

WALTER L. CARLSON, *Primary Examiner.*

RUDOLPH V. ROLINEC, *Examiner.*

G. L. LETT, *Assistant Examiner.*